(No Model.)
R. T. LACY, Jr.
MINERAL LOCATOR.
No. 507,018. Patented Oct. 17, 1893.
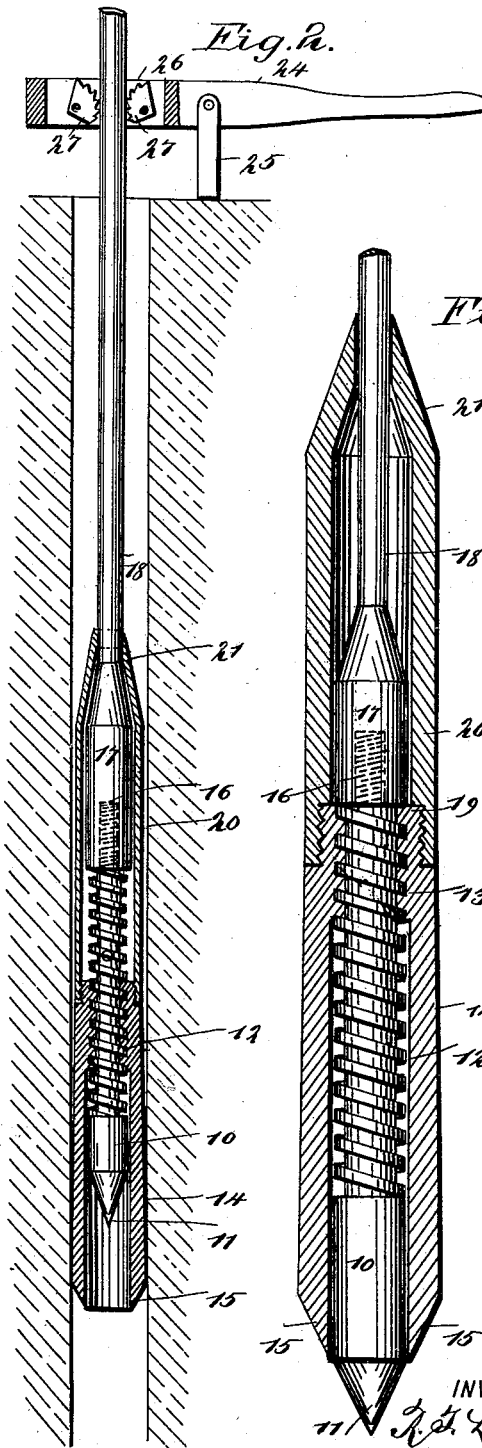

UNITED STATES PATENT OFFICE.

ROBERT T. LACY, JR., OF CAMDEN, NEW JERSEY.

MINERAL-LOCATOR.

SPECIFICATION forming part of Letters Patent No. 507,018, dated October 17, 1893.

Application filed June 6, 1893. Serial No. 476,789. (No model.)

*To all whom it may concern:*

Be it known that I, ROBERT T. LACY, Jr., of Camden, in the county of Camden and State of New Jersey, have invented a new and Improved Mineral-Locator, of which the following is a full, clear, and exact description.

My invention relates to improvements in that class of devices which are used for bringing up samples of earth, rock and mineral, from different levels, so as to test the nature of the said substances at various points to determine whether or not there are at any of the various levels substances worth mining.

The object of my invention is to produce a very simple apparatus of this kind, which may be easily driven into the earth to any necessary depth, which is adapted to gather a sufficient quantity of material for a test at any desired level, which is provided with means for holding the gathered material in such a way that it cannot be accidentally displaced, and which is adapted to be easily withdrawn from the earth when desired.

To these ends my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a broken sectional elevation of the apparatus embodying my invention. Fig. 2 is a longitudinal section, showing in detail the construction of the apparatus and also a convenient instrument for raising it; and Fig. 3 is an enlarged detail longitudinal section of the lower end of the tool which is adapted to be driven into the ground.

The instrument is provided at its lower end with a bit, comprising a cylindrical head 10 which has at its lower extremity a conical hardened point 11 to enable it to be driven through any light rock or hard earth, and this head has an elongated shank having a coarse screw thread 12, and this thread fits in an internally threaded portion 13 of the sheath 14 which incases the head 10 and the screw 12 thereon, and which sheath has its lower end beveled so as to form an edge, as shown at 15, the bevel coinciding with the pitch of the conical point 11 of the head 10, so that the instrument may be driven easily into the ground. The upper end of the shank of the head 10 is reduced as shown at 16, and this reduced end is also threaded, the pitch being opposite to the pitch of the thread on the shank, so that a firm screw connection may be made between the shank and the head 17 on the lower end of the driving rod 18, which rod may be of the usual kind and may be made of any necessary length by coupling sections to it in a common and well known manner. The upper end of the sheath 14 is also reduced and screw threaded, as shown at 19, and this portion is screwed to a cap 20 of the same diameter as the sheath, the cap serving to incase the head 17 and the threaded shank 12 when the latter is raised, so as to prevent the screw from coming into contact with any substance and also to prevent the material to be tested from being washed or otherwise forced from the screw. The upper end of the cap 20 is reduced, as shown at 21, this tapering portion fitting the driving rod 18 closely and serving to facilitate the easy withdrawal of the instrument from the ground. The driving rod 18 may be provided with a collar 22, this being secured to the upper section of the rod; that is, to that part of the rod which is above the ground, and a heavy hammer 23 is arranged to slide on the rod above the collar 22 and by raising the hammer repeatedly and permitting it to drop upon the collar, the force of the blows will drive the rod and the tool at its lower end, into the ground.

When the tool has been sunk to the desired depth to make a test, the driving rod is turned in any convenient way so as to draw up point 11 inside of sheath 14, and leave the lower end of the sheath 14 open. A blow is then struck with the hammer 23, which drives the tool down filling the opening in the lower end of the sheath 14, with the mineral being examined, when the tool may be withdrawn, carrying with it sufficient material for a test, and, it will be observed by reference to Figs. 2 and 3, that the head 10 of the bit forms a stopper for the sheath so that the material in the sheath is thus secured and may be recovered after the instrument has been withdrawn from the ground.

In Fig. 2 I have shown a convenient device for withdrawing the testing tool from the ground, which device comprises a lever 24 having a slotted end 26 through which the driving rod 18 may extend, a support 25 pivoted to the lever and serving as its fulcrum, this support being adapted to rest upon the ground, and toothed cams 27 pivoted in the recess of the lever and adapted to impinge upon the driving rod. It will be observed that by working the lever up and down, the cams may be made to successively engage opposite sides of the rod, and the rod and the testing tool at its lower end may thus be withdrawn. Any other suitable means may be employed, however, for withdrawing the tool, without affecting the principle of my invention.

Having thus described my invention, I claim as new, and desire to secure by Letters Patent—

1. The combination with the driving rod and a pointed bit, of a tubular sheath of greater length than said bit and through the lower end of which the said bit projects, and an adjustable connection between the rod and the sheath for adjusting the bit up into the sheath and thereby converting the lower open end of the sheath into a receptacle, substantially as and for the purpose set forth.

2. The combination with a driving rod, and a pointed bit having a screw section between its point and lower end of the rod, of a tubular sheath open at its lower end and provided with a threaded opening in its upper end through which said screw passes; the sheath being of greater length than the bit, whereby the bit may be projected through the lower open end of the sheath in the operation of driving and withdrawn up into the sheath to form a receptacle to receive a sample of the strata reached by the bit, substantially as set forth.

3. The combination with the drive rod having an enlarged lower end, a screw of less diameter extending from the said end, and a pointed bit on the lower end of the screw, of a sheath of greater length than the bit and having a threaded opening in its upper end through which said screw passes to project the bit beyond or retract it within the lower open end of the sheath; the lower face of the said enlarged drill-rod end contacting with the upper end of the sheath when the bit is projected, substantially as set forth.

4. An apparatus of the kind described, comprising a driving rod having a head at its lower end, a pointed bit having a screw shank connected with the head of the driving rod, a sheath incasing the bit and threaded to fit the shank thereof, the sheath being of greater length than the bit or point to permit it to be retracted therein and said sheath having its lower end beveled to form an edge, and a cap secured to the sheath and enveloping the head of the driving rod, substantially as described.

ROBERT T. LACY, JR.

Witnesses:
RICHARD C. LACY,
JAMES M. CASSADY.